(12) United States Patent
Roy et al.

(10) Patent No.: US 8,602,702 B2
(45) Date of Patent: Dec. 10, 2013

(54) SEAT TRACK FITTING

(75) Inventors: Philippe Roy, Bourges (FR); Peter Driessen, Mukiltee, WA (US); Vishwanath Bhat, Lewisville, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 13/354,754

(22) Filed: Jan. 20, 2012

(65) Prior Publication Data
US 2012/0235011 A1 Sep. 20, 2012

Related U.S. Application Data

(63) Continuation-in-part of application No. 12/822,158, filed on Jun. 23, 2010, now Pat. No. 8,371,781.

(60) Provisional application No. 61/434,621, filed on Jan. 20, 2011, provisional application No. 61/269,341, filed on Jun. 23, 2009.

(51) Int. Cl.
B61D 45/00 (2006.01)
A47B 7/00 (2006.01)

(52) U.S. Cl.
USPC ......... 410/105; 410/104; 248/503; 244/118.6

(58) Field of Classification Search
USPC ............. 410/104–105, 102, 8, 108, 116–117, 410/96–97; 248/503; 244/118.6
See application file for complete search history.

(56) References Cited

U.S. PATENT DOCUMENTS

| 3,241,501 | A | * | 3/1966 | Watts | 410/105 |
| 3,392,954 | A | | 7/1968 | Malitte | |
| 3,605,637 | A | | 9/1971 | Prete | |
| 3,620,171 | A | | 11/1971 | Brenia et al. | |

(Continued)

FOREIGN PATENT DOCUMENTS

DE 202004015211 12/2004
EP 0021933 1/1981

(Continued)

OTHER PUBLICATIONS

Office Action dated May 11, 2012 in U.S. Appl. No. 12/822,158.

(Continued)

Primary Examiner — Glenn Dayoan
Assistant Examiner — Sunsurraye Westbrook
(74) Attorney, Agent, or Firm — Dean W. Russell; Tiffany L. Williams; Kilpatrick Townsend & Stockton LLP

(57) ABSTRACT

Described are track fitting assemblies having a main body with at least one plunger aperture, at least one button aperture intersecting the at least one plunger aperture, and at least one disengagement recess, at least one shear plunger assembly having a plunger, a shear pin, a plunger-spring, and a button comprising a recess, and a track with a pair of lips having at least one opening. The shear plunger assembly is configured to have a disengaged position, wherein the button is extended from the main body and the shear pin is positioned within the main body, and an engaged position, wherein the button is positioned substantially flush with the main body, the recess of the button is positioned substantially flush with the disengagement recess of the main body, and the shear pin is extended from the main body and within the at least one opening.

20 Claims, 14 Drawing Sheets

(56) References Cited

U.S. PATENT DOCUMENTS

| | | | |
|---|---|---|---|
| 4,109,891 A | | 8/1978 | Grendahl |
| 4,396,175 A | * | 8/1983 | Long et al. ............... 248/503.1 |
| 4,493,470 A | | 1/1985 | Engel |
| 4,496,271 A | * | 1/1985 | Spinosa et al. ............... 410/105 |
| 4,708,549 A | | 11/1987 | Jensen |
| 4,776,533 A | | 10/1988 | Sheek et al. |
| 4,796,837 A | * | 1/1989 | Dowd ............... 244/122 R |
| 4,913,489 A | | 4/1990 | Martin |
| 5,337,979 A | | 8/1994 | Bales et al. |
| 5,762,296 A | | 6/1998 | Gilbert |
| 5,823,727 A | | 10/1998 | Lee et al. |
| 5,871,318 A | | 2/1999 | Dixon et al. |
| 5,975,822 A | * | 11/1999 | Ruff ............... 411/553 |
| 6,260,813 B1 | | 7/2001 | Whitcomb |
| 6,299,230 B1 | * | 10/2001 | Oettl ............... 296/65.03 |
| 6,902,365 B1 | | 6/2005 | Dowty |
| 6,918,722 B1 | | 7/2005 | Girardin |
| 7,455,276 B2 | | 11/2008 | Frey |
| 7,695,225 B2 | | 4/2010 | Pozzi |
| 2006/0104740 A1 | | 5/2006 | Girardin et al. |
| 2007/0026707 A1 | | 2/2007 | Pozzi |
| 2007/0228215 A1 | | 10/2007 | Hudson et al. |
| 2009/0026827 A1 | | 1/2009 | Bishop |
| 2011/0013972 A1 | | 1/2011 | Roy |

FOREIGN PATENT DOCUMENTS

| | | |
|---|---|---|
| EP | 1892142 | 2/2008 |
| GB | 2219493 | 12/1989 |
| WO | 2005028306 | 3/2005 |
| WO | 2008113610 | 9/2008 |
| WO | 2010016086 | 2/2010 |
| WO | 2011005600 | 1/2011 |
| WO | 2011005600 A3 | 6/2011 |
| WO | 2012100152 | 7/2012 |

OTHER PUBLICATIONS

International Preliminary Report on Patentability dated Jan. 12, 2012 in Application No. PCT/US2010/039722.

International Search Report and Written Opinion dated May 3, 2011 in Application No. PCT/US2010/0379722.

International Search Report and Written Opinion dated Jul. 3, 2012 in Application No. PCT/US2012/022015.

Response to Office Action dated Sep. 11, 2012 in U.S. Appl. No. 12/822,158.

Notice of Allowance dated Nov. 13, 2012 in U.S. Appl. No. 12/822,158.

International Preliminary Report on Patentability dated Aug. 1, 2013 in Application No. PCT/US2012/022015.

* cited by examiner

SEAT TRACK FITTING

CROSS REFERENCE TO RELATED APPLICATIONS

This application is related to and claims priority benefits from U.S. Provisional Application Ser. No. 61/434,621, filed on Jan. 20, 2011, entitled SEAT TRACK FITTING, and is a continuation-in-part of U.S. patent application Ser. No. 12/822,158, filed on Jun. 23, 2010, entitled SEAT TRACK FITTING, now pending, which is related to and claims priority benefits from U.S. Provisional Application Ser. No. 61/269,341, filed on Jun. 23, 2009, entitled PRELOADED STUD TRACK FITTING. The '621, '158, '341 applications are hereby incorporated in their entireties by this reference.

FIELD OF THE INVENTION

The field of the invention relates to seat fitting assemblies for passenger seats or the like.

BACKGROUND

Many vehicle seats such as those on passenger aircraft, buses, trains, and the like are removably mounted in a track secured to the floor of the vehicle. The tracks typically include a channel along their entire length, where two lips partially enclose the upper side of the channel to form a slot. Semicircular cutout portions are uniformly spaced along the lips to create a series of larger circular openings in the slot. Typically, a track fitting assembly is used to couple the passenger seat to the track, where the track fitting body has studs that extend outwardly from the track fitting body. The studs are typically designed with a flared end attached to a narrower neck. The flared ends of the studs pass through the larger openings, and the track fitting assembly is moved along the track until the flared ends contact the underside of the slot lips. Bolts or wedge-type elements are commonly used to create a snug fit between the studs and the track lips to prevent seat rattle and unintended seat displacement.

In some instances, track fitting assemblies do not have sufficient load-carrying capacity and strength to sufficiently secure the passenger seat to the track to prevent seat rattle or to withstand forces that may be placed on the passenger seat. For example, crashes, turbulence, rapid deceleration, or other impacts may subject the passenger seat to longitudinal loads. In situations where the coupling between the track fitting and the track lacks sufficient strength, application of such loads may result in the passenger seat becoming misaligned or dislodged from the track, increasing the risk of injury or death to the passenger seat occupant. Accordingly, there is a need for a passenger seat track fitting assembly that provides sufficient load-carrying capacity and strength to prevent seat rattle in normal conditions and to transfer at least some of the load exerted on the passenger seat during a crash to the track.

SUMMARY

Some embodiments of the track fitting assembly include a main body comprising at least one plunger aperture, at least one button aperture, and at least one disengagement recess; at least one shear plunger assembly comprising a plunger, a shear pin, a plunger-spring, and a button comprising a recess; and a track comprising a pair of lips comprising at least one opening. The shear plunger assembly may be configured to have a disengaged position, wherein the button is extended from the main body and the shear pin is positioned within the main body, and an engaged position, wherein the button is positioned substantially flush with the main body, the recess is positioned substantially flush with the disengagement recess, and the shear pin is extended from the main body and within the at least one opening.

Some embodiments of the track fitting assembly may further include at least one pre-loaded stud assembly and at least one stud aperture within the main body, wherein the pre-loaded stud assembly comprises a stud, a fastening device, a stud-spring, and a compressing device. The pre-loaded stud assembly may be configured to have a clamped position, wherein the compressing device is disengaged from the stud, the stud-spring is in an uncompressed position, and the flange of the stud is coupled to the pair of lips, and an unclamped position, wherein the compressing device is engaged with the stud, the stud-spring is in a compressed position, and the flange of the stud is uncoupled from the pair of lips.

The track fitting assembly may be coupled to a track by positioning the flange within one of at least two openings in the pair of lips; sliding the track fitting assembly along the track until the flange is adjacent the pair of lips; rotating the compressing device until it is disengaged from the stud, the stud-spring is in an uncompressed position, and the flange is coupled to the pair of lips; and pressing the button into the main body until the button is positioned substantially flush with the main body, the recess is positioned substantially flush with the disengagement recess, and the shear pin is extended from the main body and within a second one of the at least two openings.

The track fitting assembly may be uncoupled from a track by inserting a tool into the recess and the disengagement recess; applying a force to the button via the recess until the button is extended from the main body and the shear pin is positioned within the main body and removed from one of the at least two openings; rotating the compressing device until the compressing device is engaged with the stud, the stud-spring is in a compressed position, and the flange is uncoupled from the pair of lips; sliding the track fitting assembly along the track until the flange is positioned within a second one of the at least two openings; and removing the track fitting assembly from the track.

DETAILED DESCRIPTION

Figure 1:
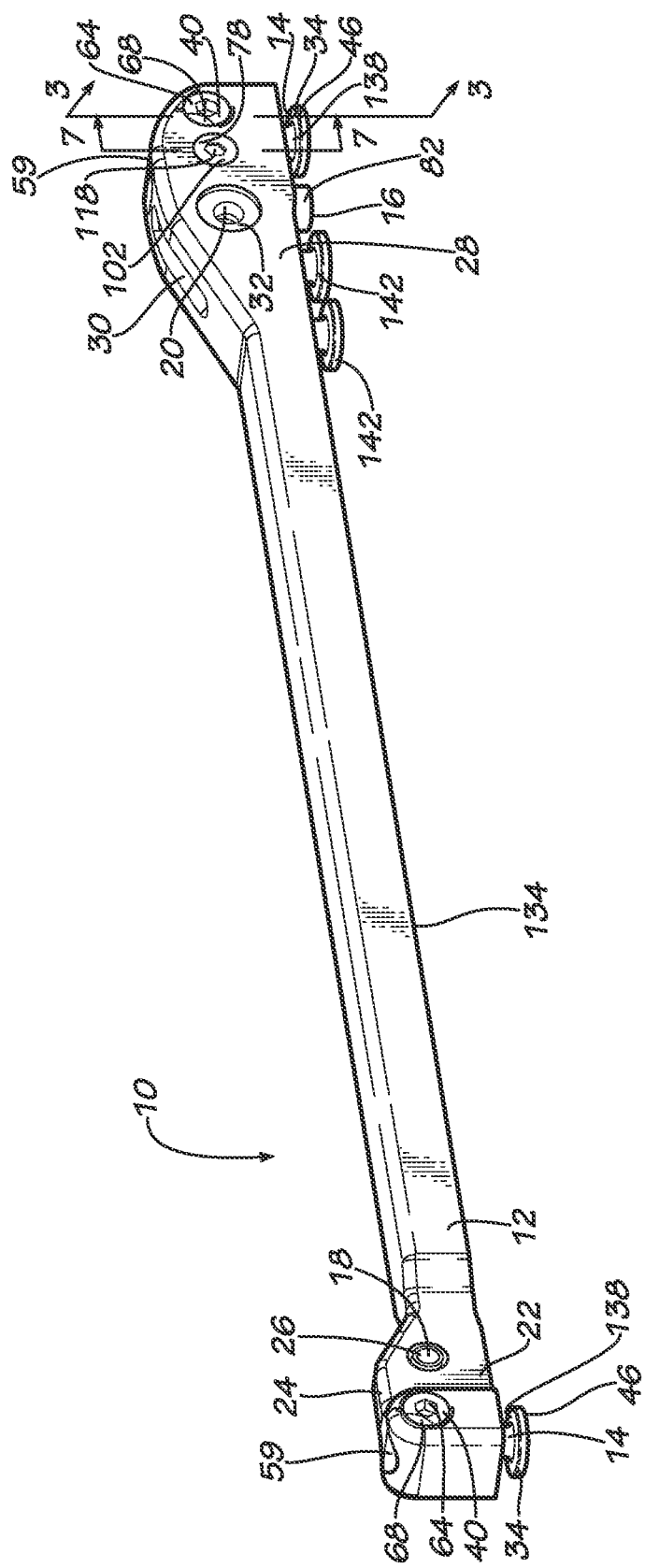
FIG. 1 is a perspective view of a track fitting assembly according to certain embodiments of the present invention.

Embodiments of the invention provide track fitting assemblies for use with a passenger seat. While the track fitting assemblies are discussed for use with aircraft seats, they are by no means so limited. Rather, embodiments of the track fitting assemblies may be used in passenger seats or other seats of any type or otherwise as desired.

FIGS. 1-8 illustrate one embodiment of a track fitting assembly 10. The track fitting assembly 10 comprises a main body 12, at least one pre-loaded stud assembly 14, and a shear plunger assembly 16.

The main body 12 may be formed of materials including but not limited to aluminum, stainless steel, other metallic materials, composite materials, or other similar materials that provide sufficient strength and stability to secure the passenger seat to a track to prevent seat rattle and to withstand forces that may be placed on the passenger seat. The main body 12 may have any suitable shape that provides sufficient stability and strength to support a passenger seat. Examples of suitable cross-sectional shapes include rectilinear, cylindrical, I-shaped, T-shaped, parabolic, or other similar shapes. In the embodiment illustrated in FIGS. 1 and 2, the main body 12 has a substantially rectilinear shape along its length that gradually expands in height and width at each end. In other embodiments, the main body 12 may have the same cross-sectional shape along its entire length or other suitable combinations of cross-sectional shapes along its length.

The main body 12 comprises a front fitting 18 that may be secured to a front leg of a passenger seat (not shown) and a back fitting 20 that may be secured to a back leg of a passenger seat (not shown). The front fitting 18 is positioned adjacent a front end 22 of the main body 12. In some embodiments, the front fitting 18 comprises an upper aperture 24 to receive the front leg of a passenger seat along with a side aperture 26 through which a bolt, screw, or other suitable fastener may pass to secure the front leg to the front fitting 18. The back fitting 20 is positioned adjacent a back end 28 of the main body 12. In some embodiments, the back fitting 20 comprises an upper aperture 30 to receive the back leg of a passenger seat along with a side aperture 32 through which a bolt, screw, or other suitable fastener may pass to secure the back leg to the back fitting 20. One of skill in the art will understand that any suitable means may be used to secure the track fitting assembly 10 to the legs of a passenger seat. For example, in other embodiments, the track fitting assembly 10 may be integrally formed with the passenger seat legs. In yet other embodiments, the track fitting assembly 10 may be chemically or mechanically bonded to the legs of a passenger seat.

Figure 2:
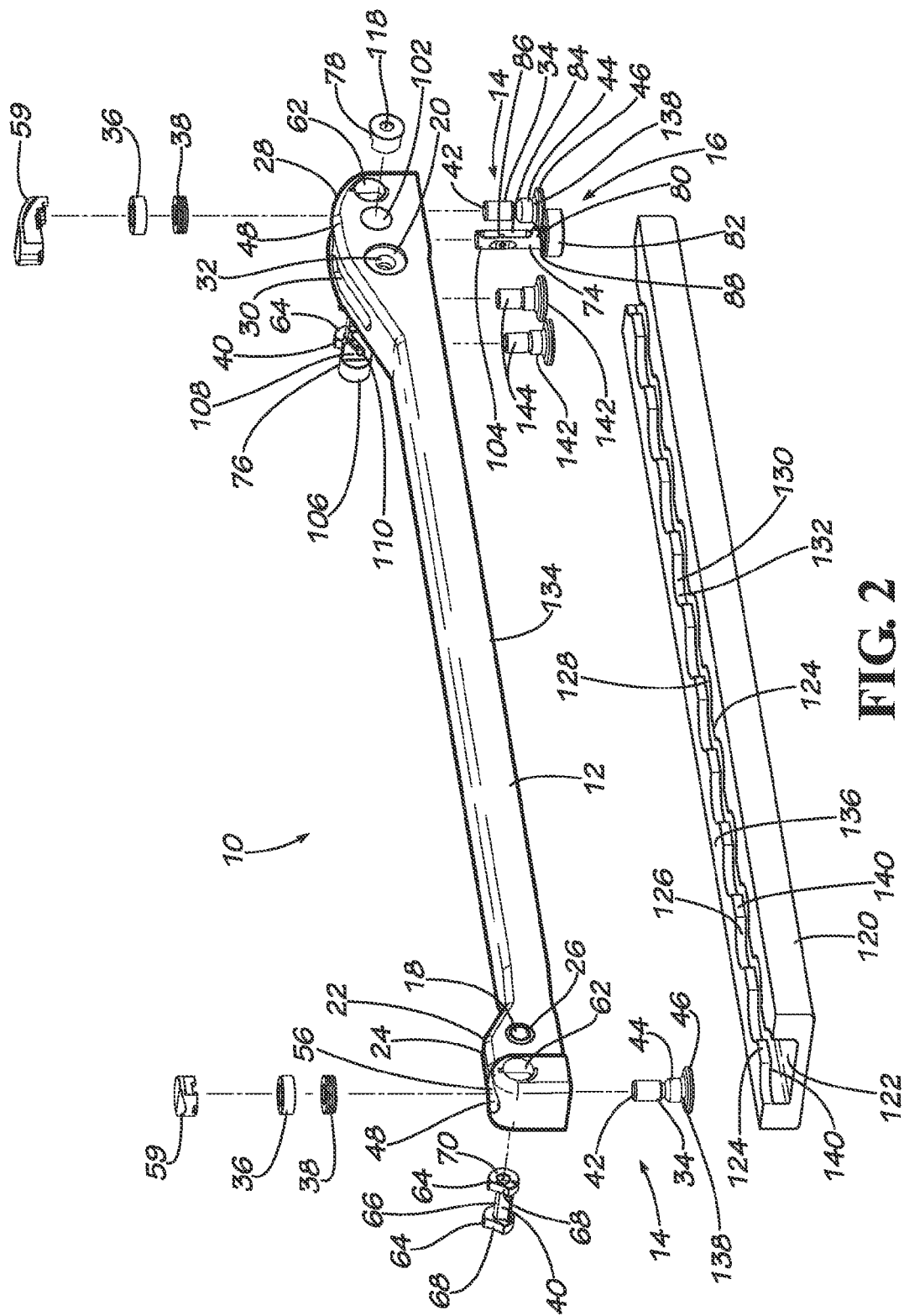
FIG. 2 is an exploded perspective view of the track fitting assembly of FIG. 1 with a track.
Figure 9:
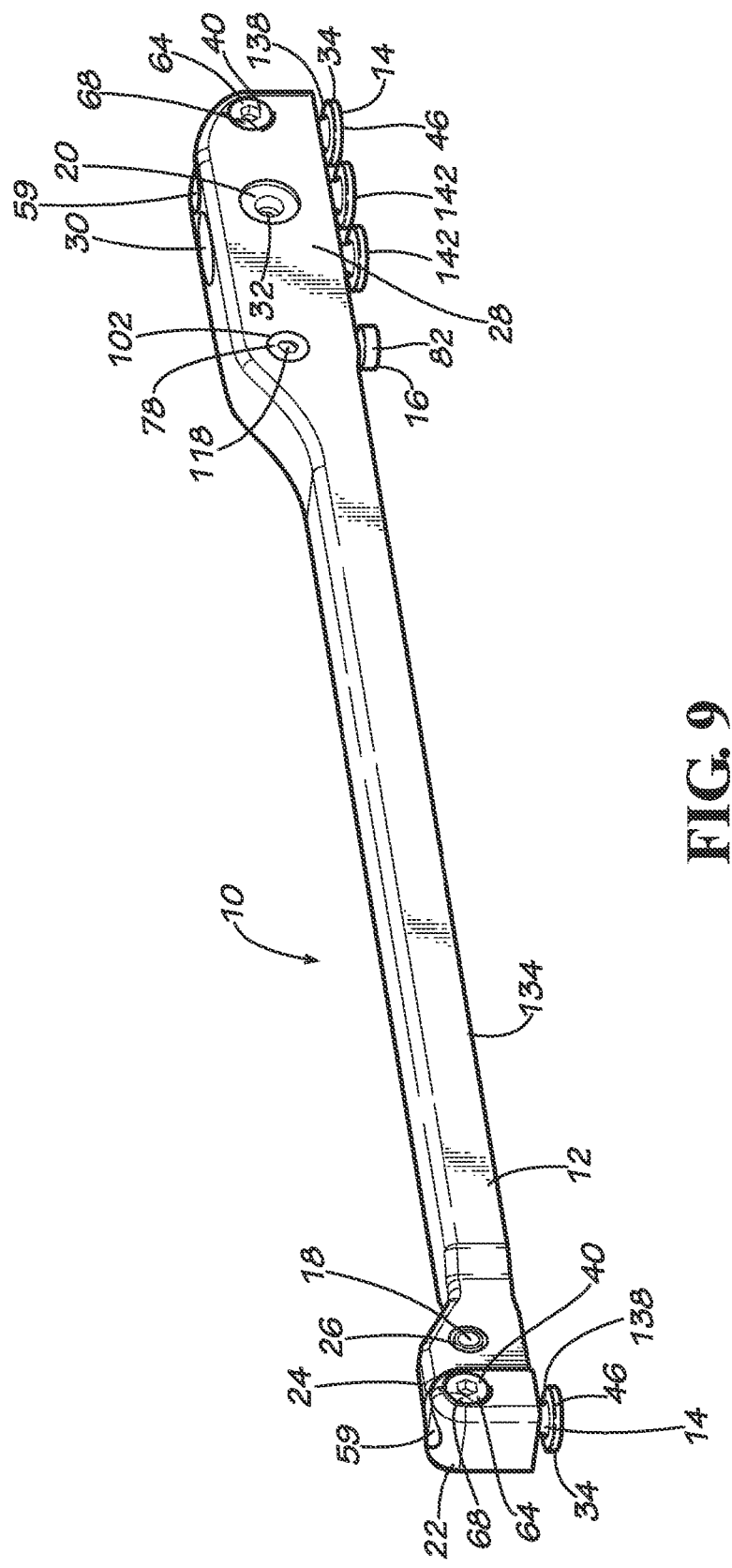
FIG. 9 is a perspective view of a track fitting assembly according to an alternative embodiment of the present invention.

In the embodiments shown in FIGS. 1, 2, and 9, the pre-loaded stud assembly 14 is coupled to the back end 28 of the main body 12. In these embodiments, another pre-loaded stud assembly 14 is coupled to the front end 22 of the main body 12. In other embodiments, a single pre-loaded stud assembly 14 may be used and may be located at the front end 22, the back end 28, or any other suitable location along the length of the main body 12. In yet other embodiments, a plurality of pre-loaded stud assemblies 14 may be positioned in any suitable configuration along the length of the main body 12.

Figure 3:
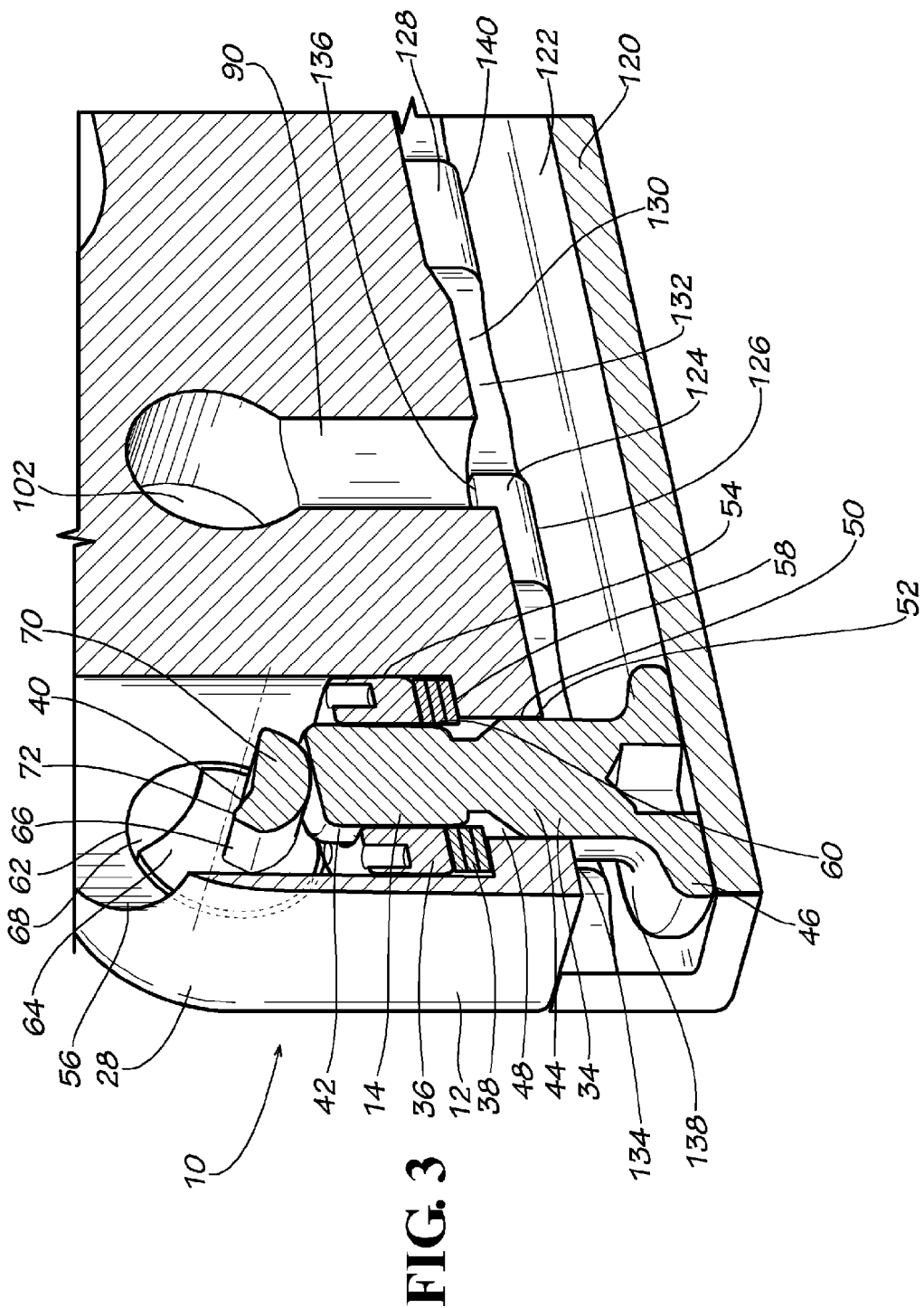
FIG. 3 is a cross-sectional perspective view of a portion of the track fitting assembly of FIG. 1 taken along line 3-3 with the cam in a fully extended position.
Figure 4:
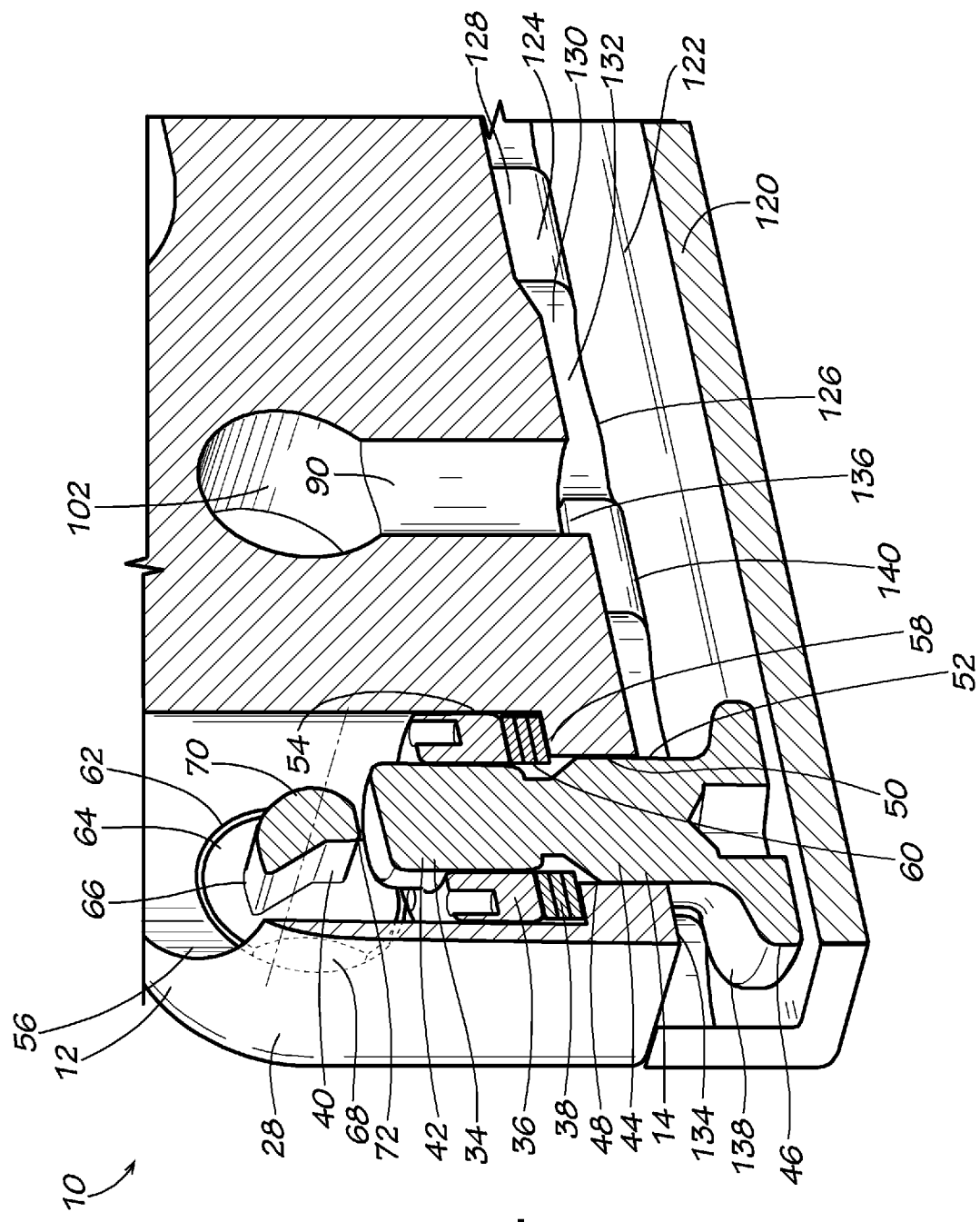
FIG. 4 is a cross-sectional perspective view of a portion of the track fitting assembly of FIG. 1 taken along line 3-3 with the cam in a home position.

As shown in FIGS. 3 and 4, the pre-loaded stud assembly 14 comprises a stud 34, a fastening device 36, a stud-spring 38, and a cam 40. The stud 34 may be formed of materials including but not limited to aluminum, stainless steel, other metallic materials, composite materials, or other similar materials. The stud 34 may have any suitable shape that allows the pre-loaded stud assembly 14 to couple with the track fitting assembly 10 including but not limited to dome, T-shaped, conical, parabolic, oval, or other similar shapes. In the embodiment illustrated in FIGS. 3 and 4, the stud 34 comprises a head 42 coupled to a midsection 44, which is in turn coupled to a flange 46. The head 42 is configured to engage with the fastening device 36. The midsection 44 has a cross-sectional area that is larger than the cross-sectional area of the head 42. Finally, the flange 46 has a cross-sectional area that is larger than the cross-sectional area of the midsection 44.

In one embodiment, the pre-loaded stud assembly 14 is coupled to the track fitting assembly 10 via a stud aperture 48 that creates an opening that passes through the back end 28 of the main body 12 in a substantially vertical orientation. In this embodiment, another pre-loaded stud assembly 14 is also coupled to the track fitting assembly 10 via another stud aperture 48 that creates an opening that passes through the front end 22 of the main body 12 in a substantially vertical orientation. In the embodiment shown in FIGS. 3 and 4, the stud aperture 48 has a smaller cross-sectional shape 50 at a lower end 52, which expands to create a larger cross-sectional shape 54 at an upper end 56. A stud-spring biasing ledge 58 is formed at the point where the cross-sectional shape of the stud aperture 48 transitions from the smaller cross-sectional shape 50 to the larger cross-sectional shape 54. However, one of skill in the relevant art will understand that other suitable configurations of the stud aperture 48 are possible.

In some embodiments, a cap 59 may be coupled to the stud aperture 48. The cap 59 may be formed of materials including but not limited to aluminum, stainless steel, other metallic materials, composite materials, injection molded or thermoformed plastic, or other similar materials. The cap 59 may have any suitable cross-sectional shape that conforms to the cross-sectional shape of the stud aperture 48. In the embodiments shown in FIGS. 1, 2, and 9, the surface of the cap 59 is shaped to conform to the contour of the main body 12.

With respect to the pre-loaded stud assembly 14 that is inserted into the stud aperture 48, the head 42 and at least a portion of the midsection 44 of the stud 34 are inserted into the lower end 52 of the stud aperture 48.

The stud-spring 38 is inserted into the upper end 56 of the stud aperture 48. Embodiments of the stud-spring 38 include but are not limited to a coiled spring, a plurality of spring washers, or other similar types of devices that supply a spring force or an elastic force. The larger cross-sectional shape 54 is shaped to accommodate the cross-sectional shape of the stud-spring 38. However, the smaller cross-sectional shape 50 has a cross-sectional shape that is smaller than the cross-sectional shape of the stud-spring 38. As a result, the stud-spring 38 is positioned adjacent the stud-spring biasing ledge 58. The stud-spring 38 also includes an inner aperture 60 that is shaped to receive the cross-sectional shape of the head 42 of the stud 34.

Finally, the fastening device 36 is inserted into the upper end 56 of the stud aperture 48. In the embodiment shown in FIGS. 2, 3, and 4, the fastening device 36 is a nut. However, one of skill in the relevant art will understand that any suitable fastening device may be used to secure the stud 34 to the main body 12 including but not limited to a clip, a pin, a toggle bolt, a threaded aperture, or other suitable device. The fastening device 36 engages the head 42 of the stud 34 via mechanical fasteners located on the fastening device 36 and the head 42. The fastening device 36 is also shaped to fit within the larger cross-sectional shape 54, but not within the smaller cross-sectional shape 50, so that the fastening device 36 is positioned adjacent the stud-spring 38.

As shown in FIGS. 1-4 and 9, the main body 12 also includes a cam aperture 62 that also creates an opening through that passes through the back end 28 of the main body 12 in a substantially horizontal orientation. In the embodiments shown in FIGS. 1, 2, and 9, another cam aperture 62 creates an opening that passes through the front end 22 of the main body 12, also in a substantially horizontal orientation. The cam aperture 62 is configured to intersect the stud aperture 48. However, one of skill in the relevant art will understand that other suitable configurations of the cam aperture 62 are possible.

The cam 40 is then inserted through the cam aperture 62. While the embodiments shown in FIGS. 1-13 are discussed with the use of the cam 40 to interact with the stud 34, the invention is by no means so limited. Rather, embodiments of the pre-loaded stud assembly 14 may be used with other compressing devices including but not limited to a screw, bolt, threaded fastening device, lever, or other similar mechanical devices that apply a compressing force to the pre-loaded stud assembly 14.

The cam 40 may be formed of materials including but not limited to aluminum, stainless steel, other metallic materials, composite materials, or other similar materials. The cam 40 comprises two ends 64 that are configured to pass through the cam aperture 62. The ends 64 are coupled to one another via a cam shaft 66. Each end 64 includes a cutout area 68. In the embodiments shown in FIGS. 1-9, the cutout area 68 has a crescent shape, but other suitable shapes include but are not limited to circular, triangular, and rectilinear.

In the embodiments shown in FIGS. 2-4, the cam shaft 66 is a cylinder with an irregular shape. The cam shaft 66 is shaped so that a radius 70 of the cam shaft 66 has a range of lengths relative to a central axis passing through the two ends 64. The cam shaft 66 may also have an oval, elliptical, scalloped-edged, or other similar shape that is configured to induce a rising and falling motion in another moving part. An observer may determine the relative position of the cam shaft 66 without directly viewing the cam shaft 66 based on the relative position of the cutout area 68.

When the cam 40 is located in the home position (as shown in FIG. 4), a point 72 of the shorter side of the cam shaft 66 is positioned above the head 42 of the stud 34, and the cutout area 68 is located approximately in the 9 o'clock position (as viewed from the perspective shown in FIGS. 3 and 4).

When the cam 40 is rotated clockwise (as viewed from the perspective shown in FIGS. 3 and 4), the length of the radius 70 of the cam shaft 66 progressively increases until the cam shaft 66 contacts the head 42, and then begins to progressively apply increasing pressure on the head 42 throughout the remainder of the rotational arc until the stud-spring 38 is compressed. In some embodiments, when the stud-spring 38 is compressed, the cam 40 has traveled approximately 130 degrees from the home position (as shown in FIG. 4) to the fully extended position (as shown in FIG. 3). In some embodiments, in the fully extended position, the cutout area 68 is located approximately between the 1 o'clock position and the 2 o'clock position (as viewed from the perspective shown in FIGS. 3 and 4). One of skill in the relevant art will understand that any suitable rotational arc may be employed in combination with any suitable cam design that results in the full compression and release of the stud-spring 38.

In the embodiment shown in FIGS. 1-9, the cam 40 is rotated by insertion of an Allen wrench handle into either of the two ends 64. However, one of skill in the relevant art will understand that the two ends 64 may be shaped to receive any appropriate tool including but not limited to the end of a flat blade screwdriver, an x-shaped head screwdriver, a square head screwdriver, a hex key, a star key, an Allen wrench, or other similar tool head.

Figure 10:
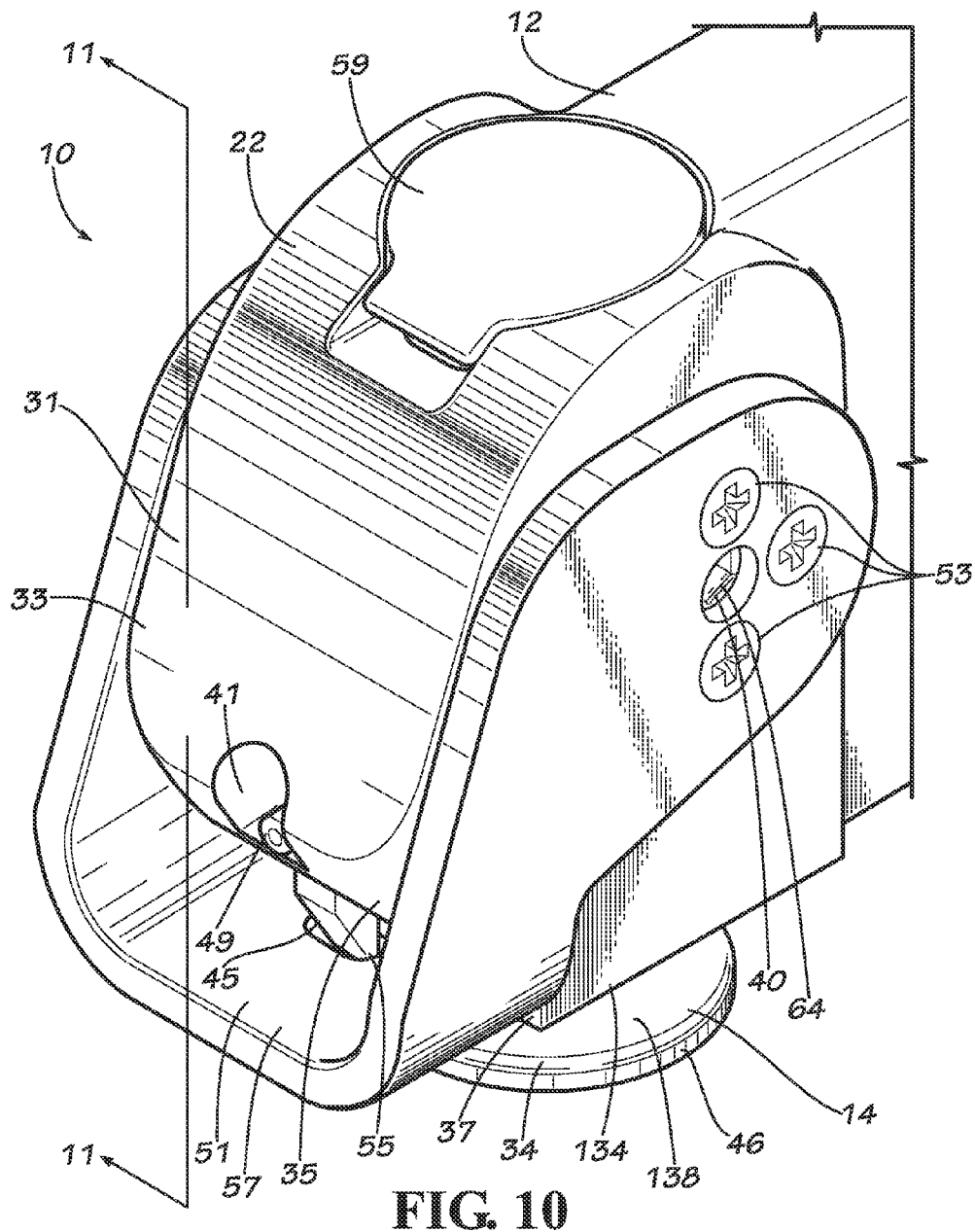
FIG. 10 is a perspective view of a portion of a track fitting assembly according to another alternative embodiment of the present invention.
Figure 11:
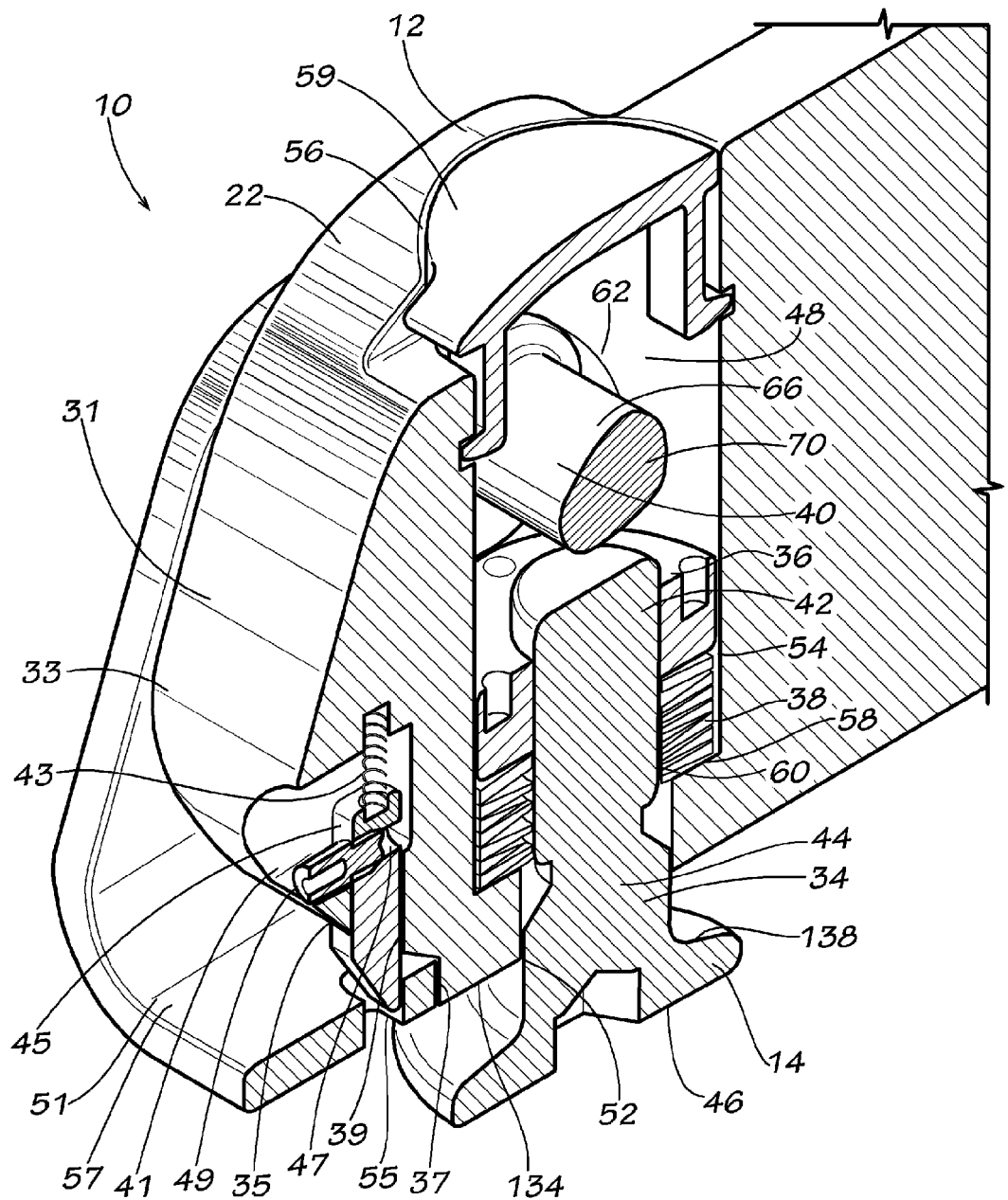
FIG. 11 is a cross-sectional perspective view of a portion of the track fitting assembly of FIG. 10 taken along line 11-11 with the cam in a home position.

In an alternative embodiment shown in FIGS. 10 and 11, the front end 22 of the main body 12 has an elongated shape 31 formed by an upper surface 33 and a lower surface 35 that extend at an angle toward one another to form a triangular shape. Other suitable shapes that may be used to form the elongated shape 31 include but are not limited to curved, parabolic, conical, or other similar shapes. A lip 37 is formed between the lower surface 35 and the lower surface 134 of the main body 12.

A locking pin aperture 39 is located adjacent the lower surface 35 and creates an opening that passes through a portion of the elongated shape 31 in a substantially vertical orientation. A set screw aperture 41 is located adjacent the junction between the upper surface 33 and the lower surface 35 creates an opening that passes through a portion of the elongated shape 31 in a substantially horizontal orientation and is configured to intersect the locking pin aperture 39. However, one of skill in the relevant art will understand that other suitable configurations of the locking pin aperture 39 and the set screw aperture 41 are possible.

A pin-spring 43 is inserted into the locking pin aperture 39 and held in place by a locking pin 45 that is also inserted into the locking pin aperture 39 below the pin-spring 43. Embodiments of the pin-spring 43 include but are not limited to a coiled spring, a plurality of spring washers, or other similar types of devices that supply a spring force or an elastic force. The locking pin 45 comprises a pin slot 47 that creates an opening that passes through the locking pin 45 in a substantially horizontal orientation. The locking pin 45 is rotated within the locking pin aperture 39 until the pin slot 47 is substantially aligned with the set screw aperture 41. A set screw 49 is then coupled to the locking pin 45 by inserting the set screw 49 into the set screw aperture 41 and securing the set screw 49 to the locking pin 45 via mechanical fasteners located on the set screw 49 and the pin slot 47. The set screw aperture 41 is shaped to allow the set screw 49 to travel a limited vertical distance when coupled to the locking pin 45. However, one of skill in the relevant art will understand that any suitable mechanical fastening device may be used to secure the locking pin 45 to the elongated shape 31 including but not limited to a clip, a pin, a toggle bolt, or other suitable device.

In the alternative embodiment shown in FIGS. 10 and 11, a lever 51 is coupled to the two ends 64 of the cam 40 via a plurality of screws 53. The lever 51 may be formed of materials including but not limited to aluminum, stainless steel, other metallic materials, composite materials, injection molded or thermoformed plastic, or other similar materials. The lever 51 is shaped to rotate around the elongated shape 31. The lever 51 also includes a release slot 55, where the release slot 55 creates an opening that passes through a lever component 57. In the embodiment shown in FIGS. 10 and 11, the release slot 55 is shaped to receive an end of the locking pin 45 and to accommodate the end of a flat blade screwdriver. In other embodiments, the release slot 55 may be shaped to accommodate an x-shaped head screwdriver, a square head screwdriver, a hex key, a star key, an Allen wrench, or other similar tool head.

One of skill in the relevant art will understand that the lever 51 may be coupled to the two ends 64 through any suitable mechanical or chemical fasteners including but not limited to the use of screws, bolts, spring pins, glue, welding, or other similar attachment means. The lever 51 is coupled to the two ends 64 in a configuration where the lever 51 is located in a lever home position when the cam 40 is located in the home position (as shown in FIG. 11). In the lever home position, the lever 51 is positioned below the elongated shape 31 and adjacent the lip 37, and the release slot 55 is positioned adjacent the locking pin 45. The pin-spring 43 applies a force to the locking pin 45 to cause the locking pin 45 to extend through the release slot 55 when the lever 51 is in the lever home position.

The lever 51 is released from the lever home position by placing the end of a flat blade screwdriver or other similar tool adjacent the point where the locking pin 45 enters the release slot 55. By applying force to the locking pin 45 at this point, the locking pin 45 is wedged upward and the pin-spring 43 is compressed until the locking pin 45 exits the release slot 55. Once released, the lever 51 is rotated along a lever rotational arc from the lever home position to a lever fully extended position, in which the cam 40 is also rotated from the home position to the fully extended position.

Figure 12:
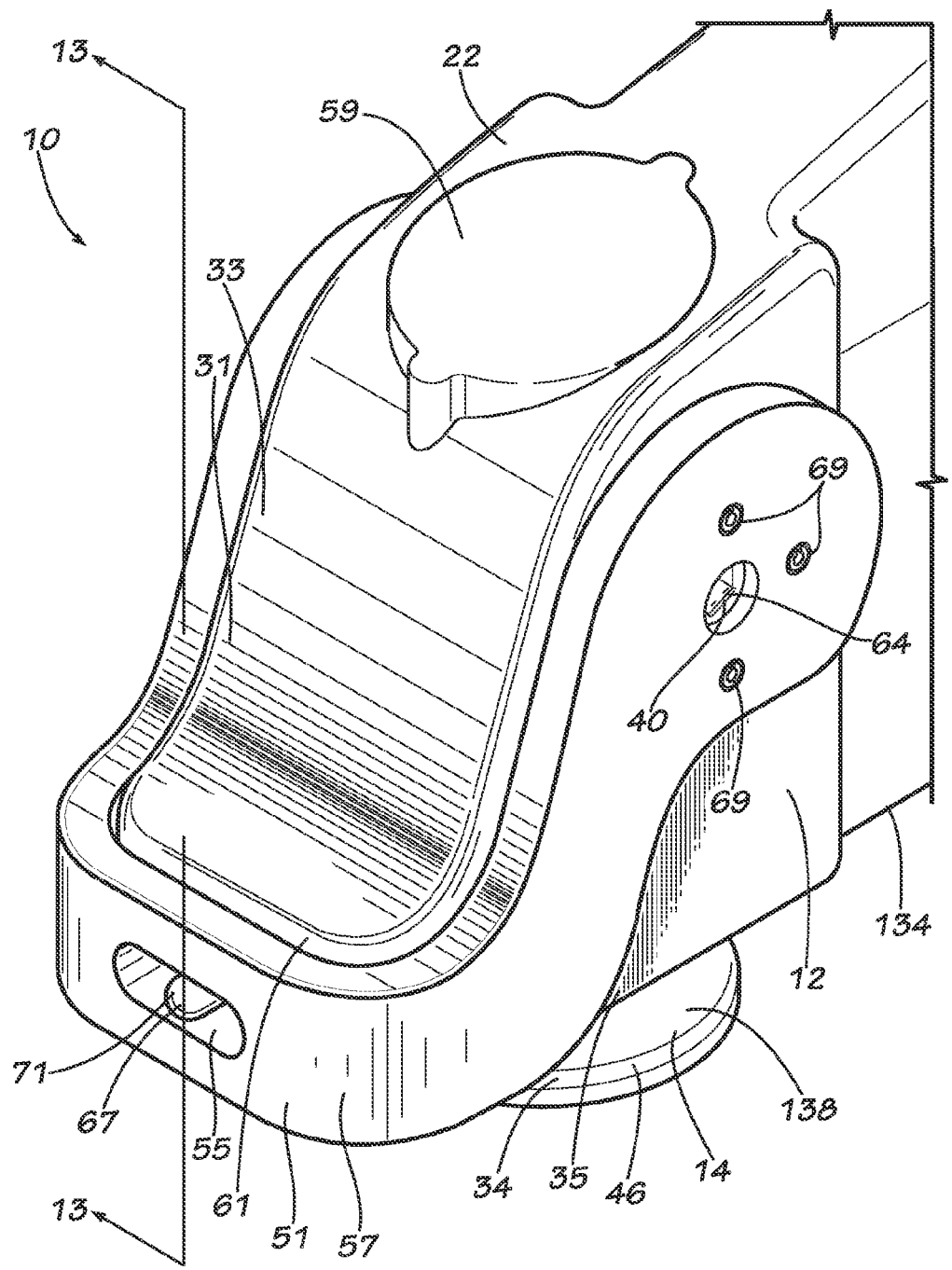
FIG. 12 is a perspective view of a portion of a track fitting assembly according to yet another alternative embodiment of the present invention.
Figure 13:
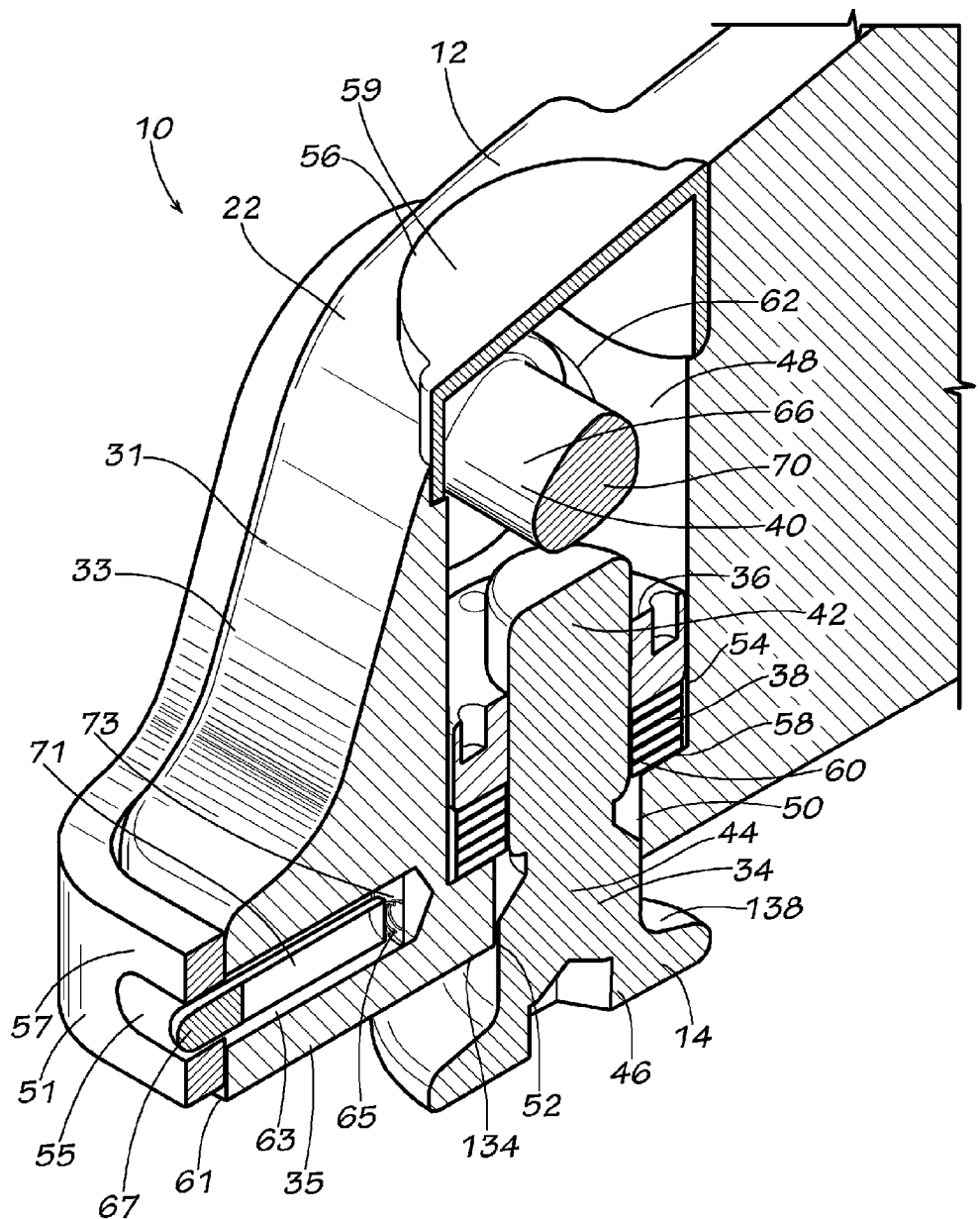
FIG. 13 is a cross-sectional perspective view of a portion of the track fitting assembly of FIG. 12 taken along line 13-13 with the cam in a home position.

In a second alternative embodiment shown in FIGS. 12 and 13, the front end 22 of the main body 12 also has the elongated shape 31 formed by the upper surface 33 and the lower surface 35. In this embodiment, the upper surface 33 curves downward toward the lower surface 35 forming an S-shape, while the lower surface 35 remains substantially parallel to and aligned with the lower surface 134 of the main body 12. The upper surface 33 and the lower surface 35 are joined via by a front surface 61. Other suitable shapes that may be used to form the elongated shape 31 include but are not limited to triangular, curved, parabolic, conical, or other similar shapes.

A spring-plunger aperture 63 is located adjacent the front surface 61 and creates an opening that passes through a portion of the elongated shape 31 in a substantially horizontal orientation. However, one of skill in the relevant art will understand that other suitable configurations of the spring-plunger aperture 63 are possible.

A spring-plunger assembly 71 is inserted into the spring-plunger aperture 63. The spring-plunger assembly 71 comprises a spring 65, a spring-plunger 67, and a housing 73. The spring-plunger assembly 71 is coupled to the spring-plunger aperture 63 via mechanical fasteners located on the housing 73 and the spring-plunger aperture 63. However, one of skill in the relevant art will understand that any suitable mechanical fastening device may be used to secure the spring-plunger assembly 71 to the elongated shape 31 including but not limited to a clip, a pin, a toggle bolt, or other suitable device.

In the alternative embodiment shown in FIGS. 12 and 13, the lever 51 is coupled to the two ends 64 of the cam 40 via a plurality of spring pins 69. Similar to the embodiment shown in FIGS. 10 and 11, the lever 51 may be formed of materials including but not limited to aluminum, stainless steel, other metallic materials, composite materials, injection molded or thermoformed plastic, or other similar materials. The lever 51 is shaped to rotate around the elongated shape 31. The lever 51 also includes the release slot 55, where the release slot 55 creates an opening that passes through the lever component 57. In the embodiment shown in FIGS. 12 and 13, the release slot 55 is shaped to receive an end of the spring-plunger 67 and to accommodate the end of a flat blade screwdriver. In other embodiments, the release slot 55 may be shaped to accommodate an x-shaped head screwdriver, a square head screwdriver, a hex key, a star key, an Allen wrench, or other similar tool head.

One of skill in the relevant art will understand that the lever 51 may be coupled to the two ends 64 through any suitable mechanical or chemical fasteners including but not limited to the use of screws, bolts, spring pins, glue, welding, or other similar attachment means. In the embodiment shown in FIGS. 12 and 13, the lever 51 is coupled to the two ends 64 in a configuration where the lever 51 is located in the lever home position when the cam 40 is located in the home position (as shown in FIG. 13). In the lever home position, the lever 51 is positioned adjacent the front surface 61, and the release slot 55 is positioned adjacent the spring-plunger 67. The spring 65 applies a force to the spring-plunger 67 to cause the spring-plunger 67 to extend through the release slot 55 when the lever 51 is in the lever home position. Embodiments of the spring 65 include but are not limited to a coiled spring, a plurality of spring washers, or other similar types of devices that supply a spring force or an elastic force.

The lever 51 is released from the lever home position by inserting the end of a flat blade screwdriver or other similar tool into the release slot 55 in order to apply a force against the spring-plunger 67 until the spring-plunger 67 exits the release slot 55 through compression of the spring 65. Once released, the lever 51 is rotated along the lever rotational arc from the lever home position to the lever fully extended position, in which the cam 40 is also rotated from the home position to the fully extended position.

In the embodiment shown in FIGS. 5-8, the shear plunger assembly 16 is coupled to the back end 28 of the main body 12 adjacent the pre-loaded stud assembly 14. In other embodiments, the shear plunger assembly 16 may be located at the front end 22, the back end 28, or any other suitable location along the length of the main body 12. In yet other embodiments, a plurality of shear plunger assemblies 16 may be positioned in any suitable configuration along the length of the main body 12.

Figure 7:
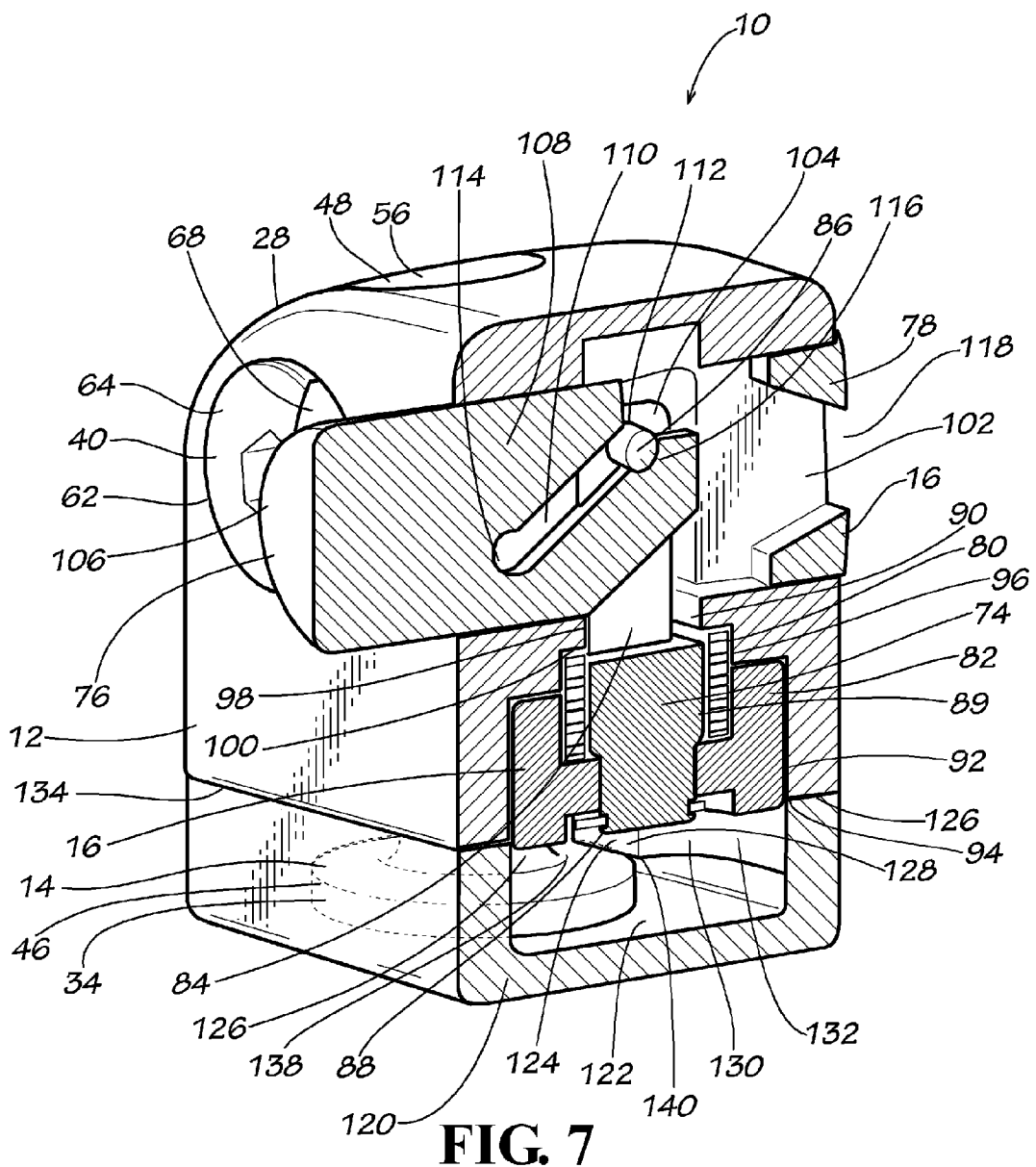
FIG. 7 is a cross-sectional perspective view of a portion of the track fitting assembly of FIG. 1 taken along line 7-7 with the shear pin in a disengaged position.
Figure 8:
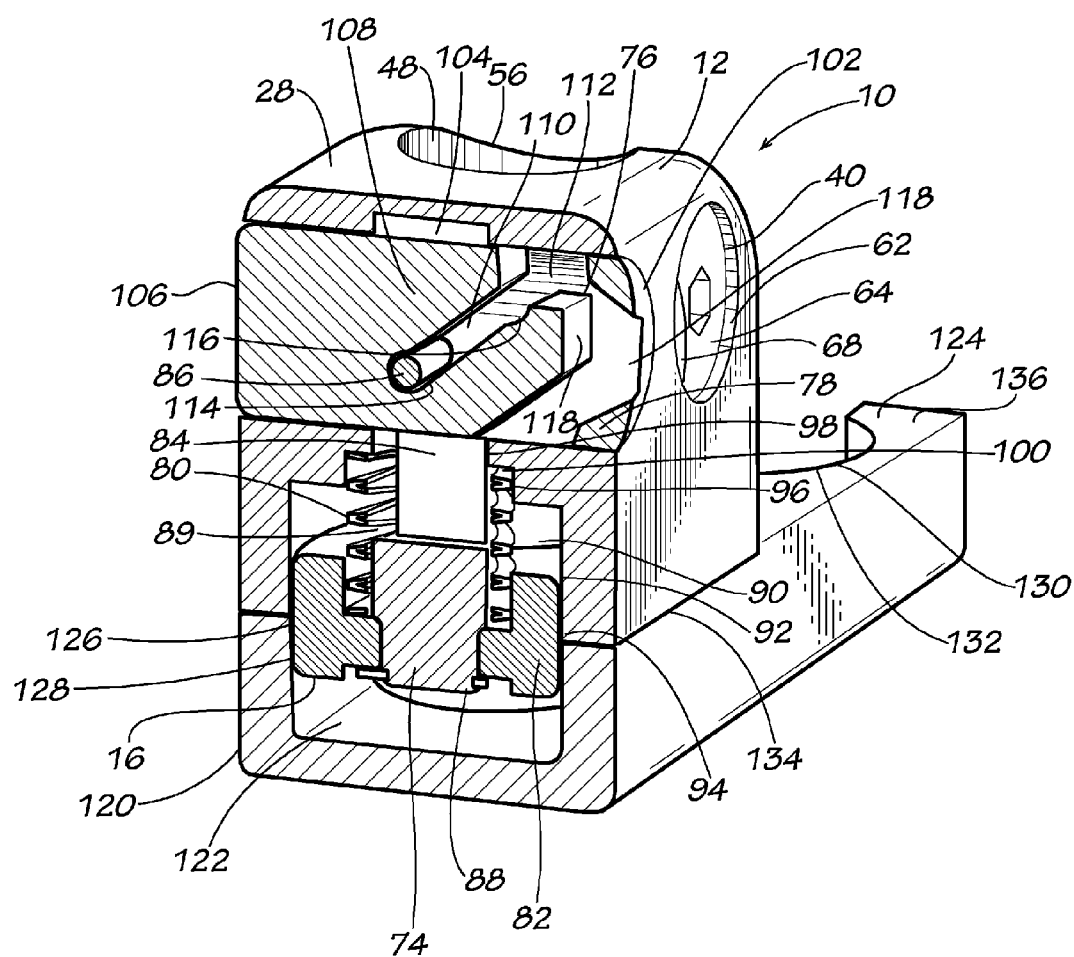
FIG. 8 is a cross-sectional perspective view of a portion of the track fitting assembly of FIG. 1 taken along line 7-7 with the shear pin in an engaged position.

The shear plunger assembly 16 comprises a plunger 74, a button 76, a plunger-spring 80, and a shear pin 82. The plunger 74 may be formed of materials including but not limited to aluminum, stainless steel, other metallic materials, composite materials, or other similar materials. The plunger 74 may have any suitable shape that allows the shear plunger assembly 16 to couple with the track fitting assembly 10 including but not limited to rectilinear, cylindrical, I-shaped, T-shaped, parabolic, oval or other similar shapes. As illustrated in FIGS. 2, 7, and 8, the plunger 74 includes a slot 84 that creates an opening that passes through the plunger 74 in a substantially horizontal orientation. A bar 86 that couples the sides of the slot 84 obstructs a portion of the space within the plunger 74 created by the slot 84.

The shear pin 82 is coupled to a lower end 88 of the plunger 74. The shear pin 82 may be formed of materials including but not limited to aluminum, stainless steel, other metallic materials, composite materials, or other similar materials. The shear pin 82 may have any suitable shape that allows the shear plunger assembly 16 to couple with the track fitting assembly 10 including but not limited to circular, semicircular, oval, triangular, parabolic, rectilinear, horse-shoe, or other similar shapes. In the embodiment illustrated in FIGS. 5 and 6, the shear pin 82 has a boomerang shape where the convex side is oriented toward the front of the main body 12 and the concave side is oriented toward the rear of the main body 12.

The plunger-spring 80 includes an inner aperture 89 that is shaped to receive the cross-sectional shape of the plunger 74. Embodiments of the plunger-spring 80 include but are not limited to a coiled spring, a plurality of spring washers, or other similar types of devices that supply a spring force or an elastic force. The plunger-spring 80 is then positioned adjacent the lower end 88 of the plunger 74 and the shear pin 82.

In one embodiment, the shear plunger assembly 16 is coupled to the track fitting assembly 10 via a plunger aperture 90 that creates an opening that passes partially through the back end 28 of the main body 12 in a substantially vertical orientation.

In the embodiment shown in FIGS. 7 and 8, the plunger aperture 90 comprises three cross-sectional shapes along its length. A shear pin cross-sectional shape 92 is located at a lower end 94 of the plunger aperture 90. The shear pin cross-sectional shape 92 is configured to substantially conform to the cross-sectional shape of the shear pin 82. The shear pin cross-sectional shape 92 transitions to a spring cross-sectional shape 96 that is sized to accommodate the combined cross-sectional area of the plunger 74 and the plunger-spring 80. The spring cross-sectional shape 96 transitions to a plunger cross-sectional shape 98 that is sized to accommodate the cross-sectional area of the plunger 74 only, forming a plunger-spring biasing ledge 100 at the point of transition. As a result, the plunger-spring 80 is biased between the plunger-spring biasing ledge 100 and the shear pin 82. However, one of skill in the relevant art will understand that other suitable configurations of the plunger aperture 90 are possible.

In one embodiment, the shear plunger assembly 16 is also coupled to the track fitting assembly 10 via a button aperture 102 that creates an opening that passes through the back end 28 of the main body 12 in a substantially horizontal orientation. The button aperture 102 is configured to intersect the plunger aperture 90 adjacent the portion of the plunger aperture 90 having the plunger cross-sectional shape 98. However, one of skill in the relevant art will understand that other suitable configurations of the plunger aperture 90 and the button aperture 102 are possible.

An upper end 104 of the plunger 74 is inserted into the plunger aperture 90. The plunger 74 is then rotated within the plunger aperture 90 until the slot 84 is substantially aligned with the button aperture 102. The button 76 is then coupled to the plunger 74 by inserting the button 76 into the button aperture 102 and the slot 84. The button 76 may be formed of materials including but not limited to aluminum, stainless steel, other metallic materials, composite materials, injection molded or thermoformed plastic, or other similar materials. The button 76 comprises a head 106 that is coupled to an extension 108. The extension 108 has a cross-sectional shape that fits within the cross-sectional shape of the slot 84. The extension 108 includes a ramp 110 that engages with the bar 86 as the extension 108 passes through the slot 84. An opening 112 of the ramp 110 is positioned at an upper corner of the extension 108. The ramp 110 extends downwardly at an angle until it reaches an end-point 114 within the extension 108 that is located diagonally downward and inward from the opening 112. The opening 112 also includes a cradle 116 that is configured to hold the bar 86 at the upper end of the ramp 110.

In some embodiments, such as the embodiments illustrated in FIGS. 5-8, a cap 78 may be inserted into the button aperture 102 from the opposite side where the button 76 was inserted. As illustrated in FIGS. 1, 2, 7, 8, and 9, the cap 78 includes an opening 118 that allows an Allen wrench handle to be inserted through the cap 78 to contact the extension 108 of the button 76. In other embodiments, the opening 118 may be shaped to accommodate the end of a flat blade screwdriver, an x-shaped head screwdriver, a square head screwdriver, a hex key, a star key, an Allen wrench, or other similar tool head.

Figure 14:
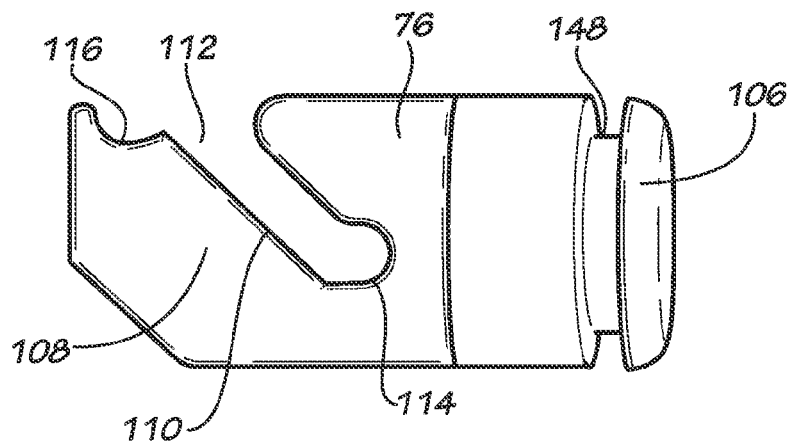
FIG. 14 is a side view of a button of a track fitting assembly according to alternative embodiments of the present invention.
Figure 15:
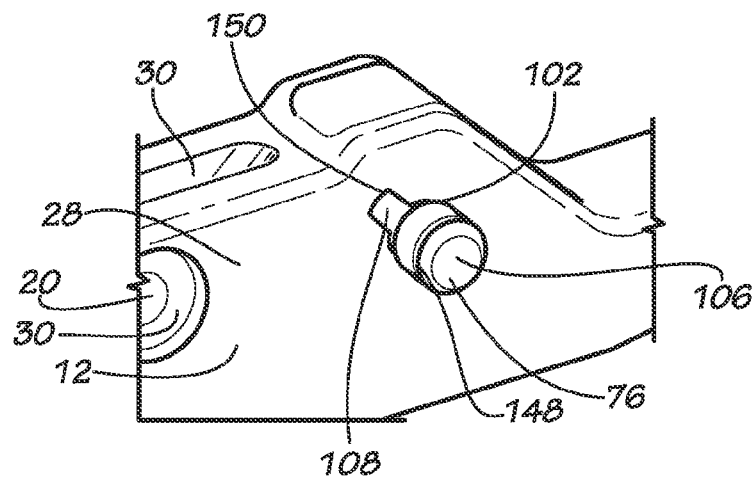
FIG. 15 is a perspective view of a track fitting assembly with the button of FIG. 14.

In some embodiments, such as the embodiments illustrated in FIGS. 14-15, the button 76 is configured to be disengaged from the same side where the button 76 was inserted. The ability to engage and disengage the button 76 from the same side may be more convenient, more easily accessible, and/or necessary in cases where a fuselage wall or any other object may restrict access to the opposite side from where the button 76 was inserted. As illustrated in FIGS. 14-15, in these embodiments, the button 76 includes a recess 148 that may be positioned between the head 106 and the extension 108. In some embodiments, the recess 148 may form a channel that encircles the cross-sectional shape of the head 106. One of skill in the relevant art will understand that the recess 148 may have any suitable shape that accommodates the end of a flat blade screwdriver, an x-shaped head screwdriver, a square head screwdriver, a hex key, a star key, an Allen wrench, or other similar tool head. Furthermore, the recess 148 may be positioned at certain locations adjacent the head 106, but not necessarily surrounding the entire cross-sectional shape of the head 106.

In use, the track fitting assembly 10 is coupled to a track 120. The track 120 may be formed of materials including but not limited to aluminum, stainless steel, other metallic materials, composite materials, or other similar materials that provides sufficient strength and stability to support the passenger seat and to withstand forces that may be placed on the passenger seat. The track 120 may have any suitable shape that provides sufficient stability and strength to support a passenger seat. Examples of suitable cross-sectional shapes include rectilinear, cylindrical, I-shaped, T-shaped, parabolic, oval, or other similar shapes. As illustrated in FIG. 2, the track 120 includes a channel 122 that extends along the length of the track 120. A pair of lips 124 partially enclose an upper side 126 of the channel 122 to form a slot 128. At least one semicircular cutout portion 130 is positioned along the length of the pair of lips 124 to create at least one circular opening 132 in the slot 128. However, one of ordinary skill in the relevant art will understand that any suitable shape may be used for the openings in the slot, including but not limited or oval, rectilinear, parabolic, or other suitable shape.

The track fitting assembly 10 is coupled to the track 120 by first rotating the cam 40 from the home position (as shown in FIG. 4) to the fully extended position (as shown in FIG. 3). The fully extended position of the cam 40 corresponds to an unclamped position of the pre-loaded stud assembly 14, in which the cam 40 contacts the stud 34 and compresses the stud-spring 38 so that the flange 46 of the stud 34 does not contact the pair of lips 124. In these embodiments, the pre-loaded stud assembly 14 is held in the unclamped position by friction between the cam 40 and the head 42 of the stud 34 and/or a positive stop location on the cam 40, such as a flat spot on the cam profile. In the embodiments shown in FIGS. 10-13, the lever 51 is disengaged from the locking mechanism (either the locking pin 45 or the spring-plunger 67) and rotated from the lever home position (as shown in FIGS.

10-13) to the lever fully extended position, where the lever fully extended position corresponds to the unclamped position of the pre-loaded stud assembly 14.

Once the pre-loaded stud assembly 14 is positioned in the unclamped position, the flange 46 of the pre-loaded stud assembly 14 is positioned above the at least one opening 132 in the slot 128. The flange 46 is then inserted through the at least one opening 132 so that the flange 46 is positioned within the channel 122 and a lower surface 134 of the main body 12 contacts an outer surface 136 of the pair of lips 124.

In order to engage the track fitting assembly 10 with the track 120, the pre-loaded stud assembly 14 must be lowered to the unclamped position so that an upper surface 138 of the flange 46 is below an inner surface 140 of the pair of lips 124. In the embodiment shown in FIGS. 1-9, the pre-loaded stud assembly 14 is lowered to the unclamped position by rotating the cam 40 from the home position (as shown in FIG. 4) to the fully extended position (as shown in FIG. 3). In the embodiments shown in FIGS. 10-13, the pre-loaded stud assembly 14 is lowered to the unclamped position by rotating the lever 51 from the home position (as shown in FIGS. 11 and 13) to the fully extended position. In other embodiments, the pre-loaded stud assembly 14 may be lowered to the unclamped position through other compressing devices including but not limited to a screw, bolt, threaded fastening device, lever, or other similar mechanical devices that apply a compressing force to the pre-loaded stud assembly 14.

When the cam 40 is rotated so that the cam shaft 66 is placed in the fully extended position (as shown in FIG. 3), the shape of the cam shaft 66 causes the stud 34 to compress the stud-spring 38, which in turn allows the stud 34 to travel downward a vertical distance sufficient to provide clearance between the upper surface 138 of the flange 46 and the inner surface 140 of the pair of lips 124. For example, the vertical distance traveled by the pre-loaded stud assembly 14 is determined by the amount of travel required to absorb the thickness of the pair of lips 124 plus variations in that thickness due to thickness tolerances, seat track variations, and an additional vertical distance required for the movement of the track fitting assembly 10 relative to the track 120. As a result, the unclamped position of the pre-loaded stud assembly 14 may require a range of vertical distances, and the cam 40 or other compressing device is shaped to position the pre-loaded stud assembly 14 at the unclamped position over a range of vertical distances.

The track fitting assembly 10 is then moved along the track 120 until the upper surface 138 of the flange 46 is located below the inner surface 140 of the pair of lips 124. The cam 40 is then rotated back to the home position (as shown in FIG. 4) so that the cam shaft 66 is no longer applying force to the stud 34 to compress the stud-spring 38. In the embodiments shown in FIGS. 10-13, the lever 51 is rotated back to the home position (as shown in FIGS. 11 and 13) so that the cam shaft 66 is no longer applying force to the stud 34 to compress the stud-spring 38. In other embodiments, other compressing devices including but not limited to a screw, bolt, threaded fastening device, lever, or other similar mechanical devices that apply a compressing force to the pre-loaded stud assembly 14 may be retracted as appropriate until the compressing device no longer contacts the stud 34.

However, the stud-spring 38 is not able to return to its fully uncompressed state due to the position of the pair of lips 124 over the flange 46, which prevents the flange 46 from returning to its original position. As a result, the pre-loaded stud assembly 14 is located in a clamped position relative to the pair of lips 124, in which the cam 40 or other compressing device does not contact the stud 34 and the flange 46 is placed in snug contact with the pair of lips 124. In the clamped position, the stud-spring 38 applies a clamping force that causes the flange 46 to remain in snug contact with the pair of lips 124. The amount of clamping force generated by the stud-spring 38 is determined based on the amount of force required to prevent seat rattle between the track fitting assembly 10 and the track 120.

In the embodiments where the stud-spring 38 comprises a plurality of spring washers, the number of spring washers may be adjusted as needed to achieve the appropriate amount of clamping force and the amount of vertical travel required. For example, when the clamping force is too high, one or more spring washers may be removed from the stud-spring 38. In contrast, when the clamping force is too low, one or more spring washers may be added to the stud-spring 38. Another reason to change the amount of spring washers is when the vertical distance is required to change due to different track thicknesses or tolerances.

In the embodiments where the stud-spring 38 comprises a plurality of spring washers, the orientation of the plurality of spring washers may also be adjusted as needed to achieve the appropriate amount of clamping force and the amount of vertical travel required. For example, the plurality of spring washers may be oriented in a parallel stack-up (as shown in FIGS. 3, 4, and 13), which is where all of the spring washers are placed in the same concave or convex orientation. A parallel stack-up results in the smaller amount of vertical travel and a greater amount of clamping force. The plurality of spring washers may also be oriented in a series stack-up (as shown in FIG. 11), which is where the plurality of spring washers are stacked in an alternative concave/convex pattern. A series stack-up results in a greater amount of vertical travel and a smaller amount of clamping force. The plurality of spring washers may also be oriented in a combination of a series stack-up and a parallel stack-up.

In some embodiments, at least one additional stud 142 may be included along the length of the main body 12 to provide additional stability between the track fitting assembly 10 and the track 120. The stud 142 may be formed of materials including but not limited to aluminum, stainless steel, other metallic materials, composite materials, or other similar materials. The stud 142 may have any suitable shape that allows the pre-loaded stud assembly 14 to couple with the track fitting assembly 10 including but not limited to dome, T-shaped, conical, parabolic, oval, or other similar shapes. In the embodiments illustrated in FIGS. 1, 2, 5, 6, and 9, the stud 142 has a shape similar to that of the stud 34, but with a slightly shorter head 144.

Each stud 142 is coupled to the main body 12 via an aperture 146. The stud 142 is coupled to the main body 12 through any suitable mechanical or chemical fasteners including but not limited to the use of a screw, a bolt, glue, welding, or other similar attachment means. In the embodiment shown in FIGS. 1, 2, 5, and 6, two additional studs 142 are coupled to the back end 28 of the main body 12 in front of and adjacent to the shear plunger assembly 16. In the alternative embodiment shown in FIG. 9, the two additional studs 142 are coupled to the back end 28 of the main body 12 between the shear plunger assembly 16 and the pre-loaded stud assembly 14, where the pre-loaded stud assembly 14 has been relocated forward of its position shown in FIGS. 1-2 and 5-8. One of skill in the relevant art will understand that any suitable number of pre-loaded stud assemblies 14 and studs 142 may be used in conjunction with the track fitting assembly 10 in any suitable location along the length of the main body 12.

Figure 5:
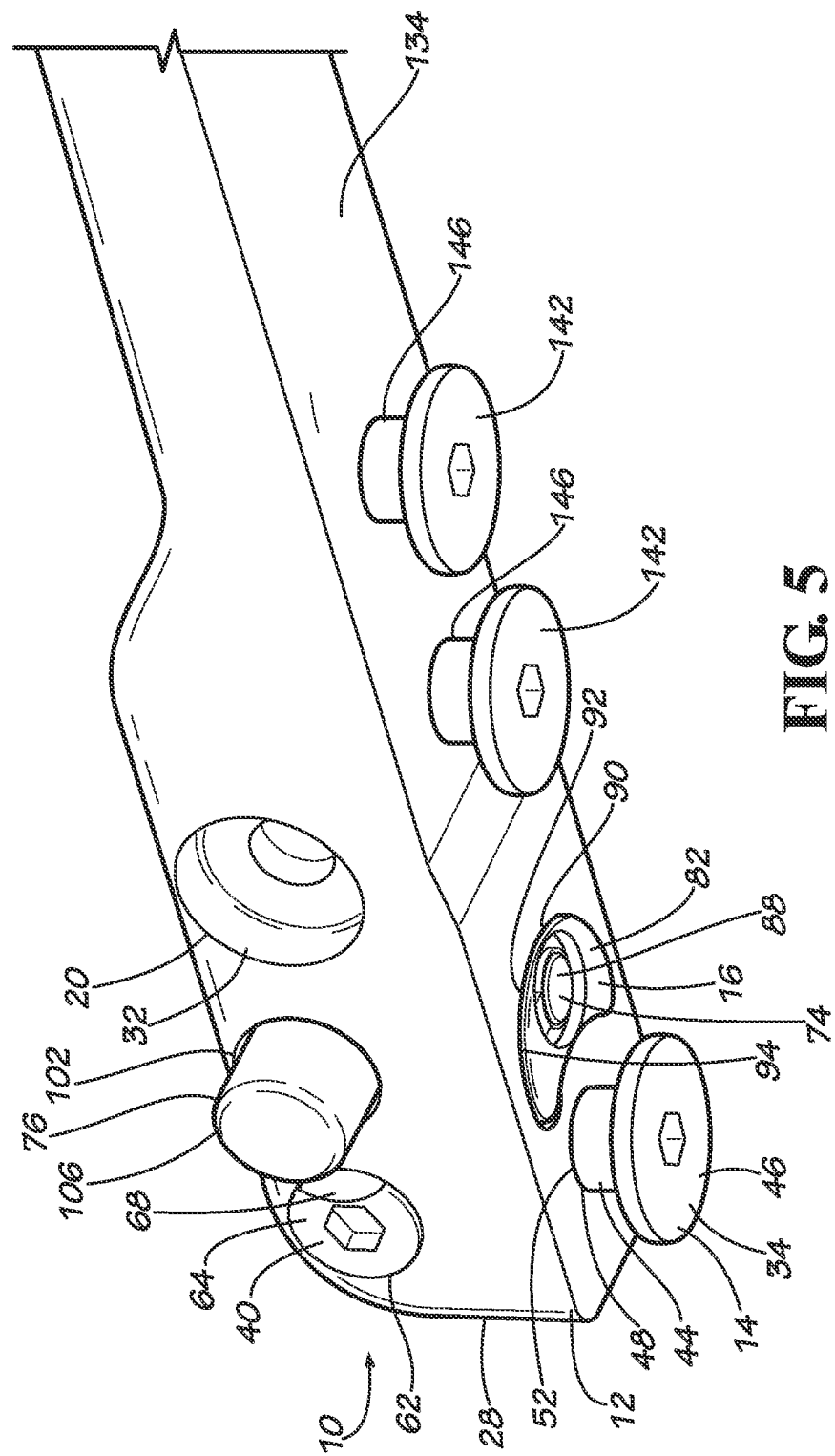
FIG. 5 is a perspective view of a portion of the track fitting assembly of FIG. 1 with the shear pin in a disengaged position.

After the track fitting assembly 10 has been secured to the track 120, the shear plunger assembly 16 is engaged. In the disengaged position (as shown in FIGS. 5, 7, and 14), the head 106 of the button 76 extends from the side of the main body 12. In this configuration, the bar 86 is located in the cradle 116 at the opening 112. In the disengaged position, the plunger 74 has traveled upward causing the plunger-spring 80 to compress against the plunger-spring biasing ledge 100 and withdrawing the shear pin 82 upward into the shear pin cross-sectional shape 92 within the main body 12. In the embodiments shown in FIGS. 5, 7, and 14, the spring force in the disengaged position is at least 10 lbf.

Figure 6:
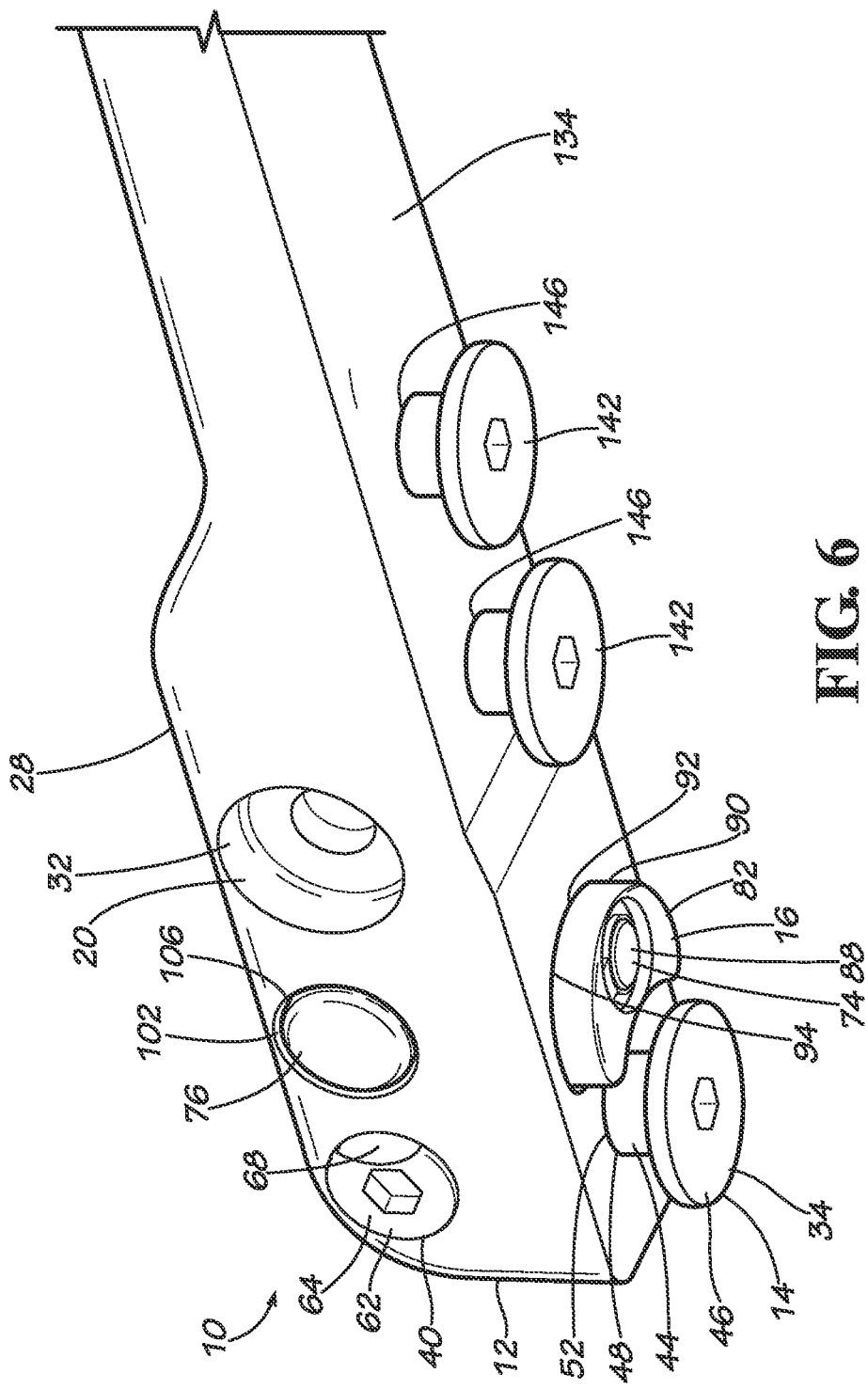
FIG. 6 is a perspective view of a portion of the track fitting assembly of FIG. 1 with the shear pin in an engaged position.
Figure 16:
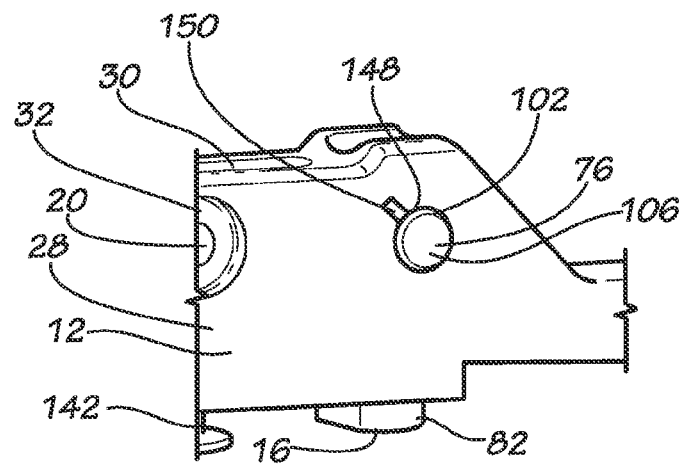
FIG. 16 is another perspective view of the track fitting assembly of FIG. 15.

To engage the shear plunger assembly 16, the head 106 of the button 76 is pressed inward until the head 106 is substantially flush with the side of the main body 12 (as shown in FIGS. 6, 8, and 16). As the head 106 of the button 76 is pressed inward, the bar 86 moves out of the cradle 116 and begins to travel down the ramp 110 until the bar 86 reaches the end-point 114. As the bar 86 travels to the end-point 114, the plunger 74 travels downward, in turn releasing the plunger-spring 80 and causing the shear pin 82 to travel downward into one of the at least one opening 132 on the slot 128. The shear plunger assembly 16 is now locked into service within one of the at least one opening 132 through the release of plunger-spring 80, the operation of gravity on the shear plunger assembly 16, and based on the geometry of the button 76. With the head 106 of the button 76 substantially flush with the side of the main body 12, a passenger is restricted from operating the button 76 to return the shear plunger assembly 16 to a disengaged position without the use of tools. Thus, in certain embodiments, as best illustrated in FIGS. 5-8, the shear plunger assembly is returned to a disengaged position by inserting an Allen wrench handle or other similar tool into the opening 118 in the cap 78 to push the button 76 out of the engaged position, where the force is applied from the opposite side from where the button 76 was inserted.

In some embodiments, as best illustrated in FIGS. 14-16, the shear plunger assembly is returned to a disengaged position by inserting a flat blade screwdriver, an x-shaped head screwdriver, a square head screwdriver, a hex key, a star key, an Allen wrench, or other similar tool into the recess 148 adjacent the head 106 of the button 76 to push the button 76 out of the engaged position, where the force is applied from the same side where the button 76 was inserted. In these embodiments, as shown in FIGS. 15 and 16, a disengagement recess 150 may be positioned adjacent an edge of the button aperture 102. Thus, in the engaged position, the recess 148 is positioned substantially flush with the disengagement recess 150. The disengagement recess 150 may be shaped to provide additional access to the recess 148 by the tool, such as at least a portion of a handle of a flat blade screwdriver, an x-shaped head screwdriver, a square head screwdriver, a hex key, a star key, an Allen wrench, or other similar tool, when the button 76 is in the engaged position. By biasing the tool against the disengagement recess 150, the back end 28 of the main body 12 acts as a fulcrum and the tool as a lever to wedge the button 76 out of the engaged position.

By application of a force greater than at least 10 lbf against the button 76, the shear plunger assembly 16 can then be returned to the disengaged position.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A track fitting assembly comprising:
   (a) a main body comprising:
      (i) at least one plunger aperture comprising a plunger-spring biasing ledge;
      (ii) at least one button aperture intersecting the at least one plunger aperture; and
      (iii) at least one disengagement recess positioned adjacent an edge of the at least one button aperture;
   (b) at least one shear plunger assembly coupled to the main body and comprising:
      (i) a plunger comprising a slot, wherein the plunger is positioned at least partially within the at least one plunger aperture so that the slot is aligned with the at least one button aperture;
      (ii) a shear pin coupled to a lower end of the plunger;
      (iii) a plunger-spring biased between the shear pin and the plunger-spring biasing ledge; and
      (iv) a button comprising a recess shaped to receive at least an end of a hex key, a star key, or a screwdriver, wherein the button is positioned at least partially within the at least one button aperture and the slot;
   (c) a track comprising a pair of lips comprising at least one opening; and
   (d) the at least one shear plunger assembly is configured to have a disengaged position and an engaged position, wherein:
      (i) the disengaged position comprises the button extended from the main body and the shear pin positioned within the main body; and
      (ii) the engaged position comprises the button positioned substantially flush with the main body, the recess of the button positioned substantially flush with the at least one disengagement recess of the main body, and the shear pin extended from the main body and within the at least one opening.

2. The track fitting assembly of claim 1, wherein the recess of the button is a channel that encircles a head of the button.

3. The track fitting assembly of claim 1, wherein the button further comprises a ramp that engages a bar attached to the slot.

4. The track fitting assembly of claim 3, wherein the bar is positioned within an upper cradle of the ramp in the disengaged position and at a lower end-point of the ramp in the engaged position.

5. The track fitting assembly of claim 1, wherein the at least one disengagement recess is shaped to receive at least a portion of a hex key, a star key, or a screwdriver.

6. The track fitting assembly of claim 1, wherein a force of greater than at least 10 lbf is required to transition the at least one shear plunger assembly from the engaged position to the disengaged position.

7. The track fitting assembly of claim 1, wherein the at least one shear plunger assembly is coupled to a back end of the main body.

8. A track fitting assembly comprising:
   (a) a main body comprising:
      (i) at least one plunger aperture comprising a plunger-spring biasing ledge;
      (ii) at least one button aperture intersecting the at least one plunger aperture; and
      (iii) at least one disengagement recess positioned adjacent an edge of the at least one button aperture;
   (b) at least one shear plunger assembly coupled to the main body and comprising:

(i) a plunger comprising a slot, wherein the plunger is positioned at least partially within the at least one plunger aperture so that the slot is aligned with the at least one button aperture;

(ii) a shear pin coupled to a lower end of the plunger;

(iii) a plunger-spring biased between the shear pin and the plunger-spring biasing ledge; and (iv) a button comprising a recess, wherein the button is positioned at least partially within the at least one button aperture and the slot;

(c) a track comprising a pair of lips comprising at least one opening;

(d) the at least one shear plunger assembly is configured to have a disengaged position and an engaged position, wherein:

(i) the disengaged position comprises the button extended from the main body and the shear pin positioned within the main body; and (ii) the engaged position comprises the button positioned substantially flush with the main body, the recess of the button positioned substantially flush with the at least one disengagement recess of the main body, and the shear pin extended from the main body and within the at least one opening;

(e) the main body comprising at least one stud aperture comprising a stud-spring biasing ledge;

(f) at least one pre-loaded stud assembly coupled to the main body, wherein the at least one pre-loaded stud assembly comprises:

(i) a stud comprising an upper end and a flange, wherein the stud is positioned at least partially within the at least one stud aperture;

(ii) a fastening device coupled to the upper end of the stud;

(iii) a stud-spring biased between the fastening device and the stud-spring biasing ledge; and (iv) a compressing device coupled to the main body, wherein the compressing device is positioned adjacent the upper end of the stud; and (g) the at least one pre-loaded stud assembly configured to have a clamped position and an unclamped position, wherein:

(i) the clamped position comprises the compressing device disengaged from the stud, the stud-spring in an uncompressed position, and the flange of the stud coupled to the pair of lips via a clamping force applied by the stud-spring; and (ii) the unclamped position comprises the compressing device engaged with the stud, the stud-spring in a compressed position, and the flange of the stud uncoupled from the pair of lips.

9. The track fitting assembly of claim 8, wherein the compressing device is a screw.

10. The track fitting assembly of claim 8, wherein the compressing device is a cam configured to position the at least one pre-loaded stud assembly in the unclamped position over a range of thicknesses of the pair of lips.

11. The track fitting assembly of claim 10, wherein the at least one pre-loaded stud assembly is held in the unclamped position by friction between the cam and the upper end of the stud.

12. The track fitting assembly of claim 10, wherein the at least one pre-loaded stud assembly is held in the unclamped position by a positive stop location on the cam.

13. The track fitting assembly of claim 10, wherein a lever is coupled to the cam and configured to rotate between a lever home position and a lever fully extended position, wherein a locking mechanism is coupled to the lever in the lever home position, and wherein the lever fully extended position corresponds to the unclamped position of the at least one pre-loaded stud assembly.

14. The track fitting assembly of claim 10, wherein the at least one pre-loaded stud assembly is coupled to a front end of the main body.

15. A method of coupling a track fitting assembly to a track, wherein the track fitting assembly comprises (i) a main body comprising at least one disengagement recess; (ii) at least one pre-loaded stud assembly coupled to the main body, wherein the at least one pre-loaded stud assembly comprises a compressing device, a stud-spring, and a stud comprising a flange; and (iii) at least one shear plunger assembly coupled to the main body, wherein the at least one shear plunger assembly comprises a shear pin and a button comprising a recess, the method comprising the steps of:

(a) positioning the flange of the at least one pre-loaded stud assembly within one of at least two openings in a pair of lips of the track;

(b) sliding the track fitting assembly along the track until the flange of the at least one pre-loaded stud assembly is adjacent the pair of lips;

(c) rotating the compressing device until the compressing device is disengaged from the stud, the stud-spring is in an uncompressed position, and the flange of the stud is coupled to the pair of lips via a clamping force applied by the stud-spring; and (d) pressing the button of the at least one shear plunger assembly into the main body until the button is positioned substantially flush with the main body, the recess of the button is positioned substantially flush with the at least one disengagement recess of the main body, and the shear pin is extended from the main body and within a second one of the at least two openings in the pair of lips of the track.

16. The track fitting assembly of claim 15, wherein the compressing device is a screw.

17. The track fitting assembly of claim 15, wherein the compressing device is a cam.

18. A method of uncoupling a track fitting assembly from a track, wherein the track fitting assembly comprises (i) a main body comprising at least one disengagement recess; (ii) at least one pre-loaded stud assembly coupled to the main body, wherein the at least one pre-loaded stud assembly comprises a compressing device, a stud-spring, and a stud comprising a flange; and (iii) at least one shear plunger assembly coupled to the main body, wherein the at least one shear plunger assembly comprises a shear pin and a button comprising a recess, the method comprising the steps of:

(a) inserting a tool into the recess of the button and the at least one disengagement recess of the main body;

(b) applying a force to the button via the recess until the button is extended from the main body and the shear pin is positioned within the main body and removed from one of at least two openings in a pair of lips of the track;

(c) rotating the compressing device until the compressing device is engaged with the stud, the stud-spring is in a compressed position, and the flange of the stud is uncoupled from the pair of lips;

(d) sliding the track fitting assembly along the track until the flange of the at least one pre-loaded stud assembly is positioned within a second one of the at least two openings; and (e) removing the track fitting assembly from the track.

19. The track fitting assembly of claim 18, wherein insertion of the tool and extension of the button are located on the same side of the main body.

20. The track fitting assembly of claim 18, wherein the tool is a hex key, a star key, or a screwdriver.

\* \* \* \* \*